United States Patent
Hoogerbrugge et al.

(10) Patent No.: US 11,055,202 B1
(45) Date of Patent: Jul. 6, 2021

(54) COMPILATION SCHEME FOR TAGGED GLOBAL VARIABLES

(71) Applicant: NXP B.V., Eindhoven (NL)

(72) Inventors: Jan Hoogerbrugge, Helmond (NL); Marcel Medwed, Steiermark (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/715,656

(22) Filed: Dec. 16, 2019

(51) Int. Cl.
*G06F 8/35* (2018.01)
*G06F 8/41* (2018.01)
*G06F 11/36* (2006.01)

(52) U.S. Cl.
CPC ............ *G06F 11/3624* (2013.01); *G06F 8/41* (2013.01); *G06F 8/434* (2013.01)

(58) Field of Classification Search
CPC .......... G06F 8/41; G06F 8/434; G06F 11/3624
See application file for complete search history.

(56) References Cited

U.S. PATENT DOCUMENTS

| | | | | |
|---|---|---|---|---|
| 9,329,845 | B2 * | 5/2016 | Cui | G06F 8/434 |
| 10,310,991 | B2 * | 6/2019 | Okhravi | G06F 12/1408 |
| 2015/0317139 | A1 * | 11/2015 | Tallam | G06F 8/4441 717/151 |
| 2017/0337142 | A1 * | 11/2017 | Arbone | G06F 8/4441 |

OTHER PUBLICATIONS

Andrey Rodchenko et al., Type Information Elimination from Objects on Architectures with Tagged Pointers Support, IEEE, 2018, retrieved online on May 4, 2021, pp. 130-143. Retrieved from the Internet: <URL: https://ieeexplore.ieee.org/stamp/stamp.jsp?tp=&arnumber=7962268>. (Year: 2018).*
ARM MTE White Paper, pp. 1-9. (Downloaded Dec. 16, 2019).
Serebryany, K., et al. "Memory Tagging: how it improves C/C++ memory saftey" Google Presentation, 29 pages. (Oct. 2018).
"Introduction to SPARE M7 and Application Data Integrity (ADI)" downioaded Jan. 22, 2020 from https://swisdev.oracle.com/_files/What-is-ADI.html, 3 pages.
Medwed et al., U.S. Appl. No. 16/427,977, filed May 31, 2019.

\* cited by examiner

*Primary Examiner* — Hanh Thi-Minh Bui

(57) ABSTRACT

A system and method for accessing a tagged global variable in software, including: randomly generating tags for global variables in the software; tagging the global variables with the random tags; creating a pointer to each global variable with the random tags in unused bits of the pointer wherein the pointer points to the associated global variable; accessing one global variable indirectly using the tagged pointer; determining whether tag on the accessed global variable matches the tag on the accessed pointer; and indicating a fault when the tag on the accessed global variable does not match the tag on the accessed pointer.

20 Claims, 3 Drawing Sheets

COMPILATION SCHEME FOR TAGGED GLOBAL VARIABLES

TECHNICAL FIELD

Various exemplary embodiments disclosed herein relate generally to a compilation scheme for tagged global variables.

BACKGROUND

It is known that nearly all non-trivial software contains bugs and if software is written in unsafe languages such as C and C++ most of these bugs are related to incorrect memory usage. This incorrect memory usage includes of out-of-bound memory accesses and use-after-free memory accesses. In the case of out-of-bound accesses, an array is accessed with an index that is out of the bounds that are associated with the array. In the case of a use-after-free access data is accessed after it has been freed (i.e., when the allocated memory is released).

In both out-of-bound accesses and use-after-free memory accesses, the effect could be incorrect behavior of the software, but such behavior could also be used by an attacker to exploit the behavior for a malicious activity. As a result, such behavior may be considered a bug.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for accessing a tagged global variable in software, including: randomly generating tags for global variables in the software; tagging the global variables with the random tags; creating a pointer to each global variable with the random tags in unused bits of the pointer wherein the pointer points to the associated global variable; accessing one global variable indirectly using the tagged pointer; determining whether tag on the accessed global variable matches the tag on the accessed pointer; and indicating a fault when the tag on the accessed global variable does not match the tag on the accessed pointer.

Various embodiments are described, wherein indicating a fault further includes stopping operation of the software.

Various embodiments are described, wherein indicating a fault further includes executing error handling software.

Various embodiments are described, wherein each of the global variables has a different randomly generated tag.

Various embodiments are described, wherein the randomly generating tags for global variables are different each time the software is executed.

Various embodiments are described, further including compiling the software.

Various embodiments are described, wherein compiling the software includes providing constructor functions to randomly generate the tags, to apply the random tags to the global variable pointer, and to apply the random tags to the global variables.

Further various embodiments relate to a system for accessing a tagged global variable in software, including: a memory; a processor connected to the memory, the processor configured to: randomly generate tags for global variables in the software; tag the global variables with the random tags; create a pointer to each global variable with the random tags in unused bits of the pointer wherein the pointer points to the associated global variable; access one global variable indirectly using the tagged pointer; determine whether tag on the accessed global variable matches the tag on the accessed pointer; and indicate a fault when the tag on the accessed global variable does not match the tag on the accessed pointer.

Various embodiments are described, wherein indicating a fault further includes stopping operation of the software.

Various embodiments are described, wherein indicating a fault further includes executing error handling software.

Various embodiments are described, wherein each of the global variables has a different randomly generated tag.

Various embodiments are described, wherein the randomly generating tags for global variables are different each time the software is executed.

Various embodiments are described, wherein the processor is further configured to compile the software.

Various embodiments are described, wherein compiling the software includes providing constructor functions to randomly generate the tags, to apply the random tags to the global variable pointer, and to apply the random tags to the global variables.

Further various embodiments relate to a non-transitory machine-readable storage medium encoded with instructions for accessing a tagged global variable in software, including: instructions for randomly generating tags for global variables in the software; instructions for tagging the global variables with the random tags; instructions for creating a pointer to each global variable with the random tags in unused bits of the pointer wherein the pointer points to the associated global variable; instructions for accessing one global variable indirectly using the tagged pointer; instructions for determining whether tag on the accessed global variable matches the tag on the accessed pointer; and instructions for indicating a fault when the tag on the accessed global variable does not match the tag on the accessed pointer.

Various embodiments are described, wherein indicating a fault further includes one of stopping operation of the software and executing error handling software.

Various embodiments are described, wherein each of the global variables has a different randomly generated tag.

Various embodiments are described, wherein the randomly generating tags for global variables are different each time the software is executed.

Various embodiments are described, further including instructions for compiling the software.

Various embodiments are described, wherein compiling the software includes providing constructor functions to randomly generate the tags, to apply the random tags to the global variable pointer, and to apply the random tags to the global variables.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
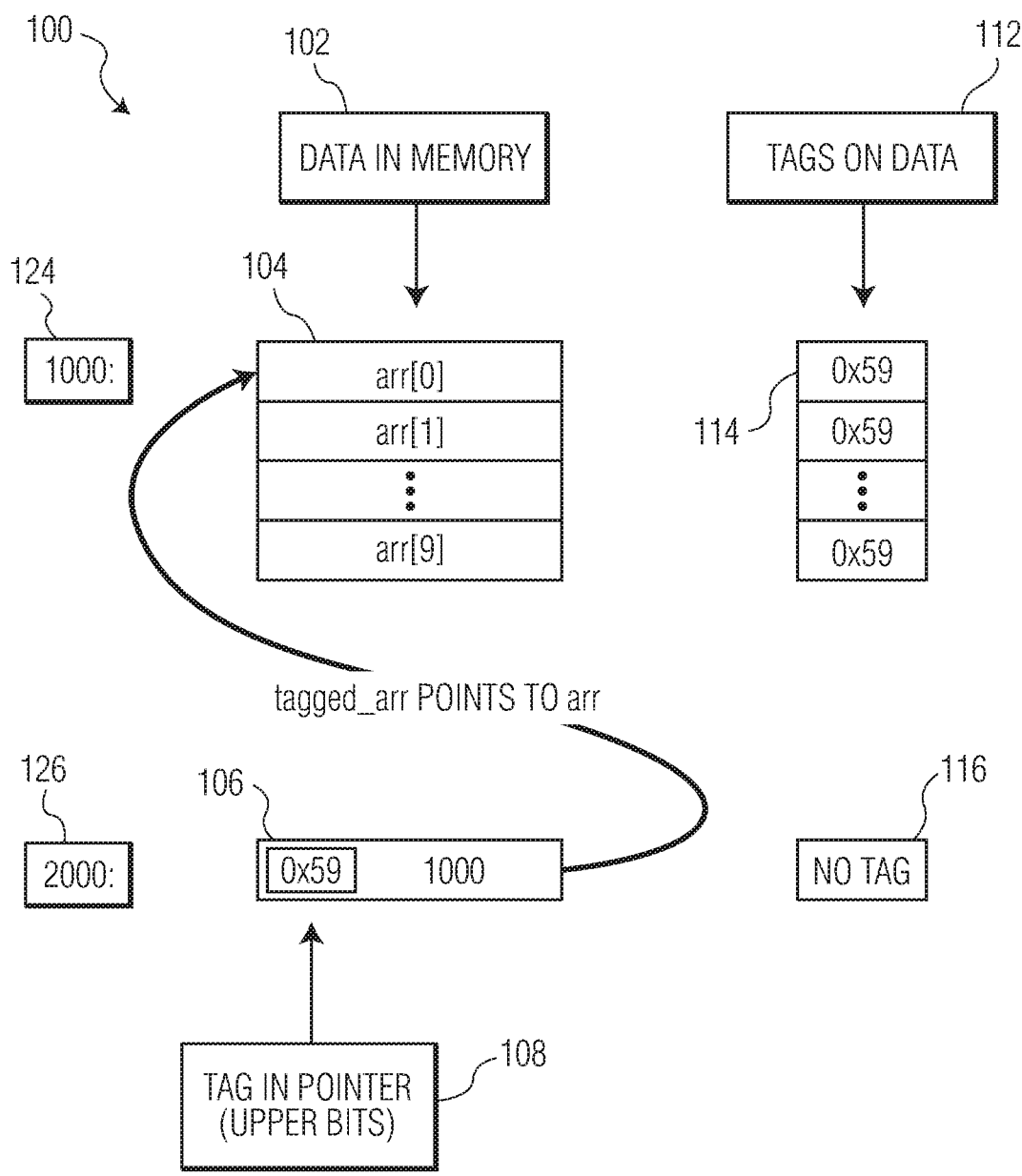
FIG. 1 is a diagram illustrating how the storage of tagged global variables may be organized in a memory.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

It is a challenge to protect applications written in unsafe languages in such a way that incorrect memory usage is detected so that such behavior cannot be exploited by an attacker. An additional requirement is that the protection should be realized with a low overhead on the execution time.

Several companies that are in the position to define instruction sets of processors proposed solutions that are based on tagged pointers. Examples are ARM's Memory Tagging Extension (MTE) and Oracle's SPARC Application Data Integrity (ADI). In these solutions a tag of a few bits (typically one byte) is stored in unused pointer bits. Furthermore, the data that is stored in memory is tagged as well. When data in memory is accessed via a pointer, the tag in the pointer has to match with the tag on the data in memory that is being accessed. An exception is raised if the tags do not match and this exception will then stop the execution and prevent an attacker from achieving their goals. The mentioned solutions provide additional instructions to insert a random tag in a pointer and also to tag the associated memory. The tag has to be random so that an attacker cannot predict it. The instruction to tag a pointer as well as other additional instructions have to be generated by the compiler or have to be present in supplied libraries that come with the compiler.

There are three classes of variables that have to be protected with tagging for full protection: local, global, and heap variables. Local and heap data are the easiest ones to protect by the compiler (or tool chain), and ARM and Oracle have support for this in their compilers. Protecting global variables is harder, and the objective of the embodiments described herein is to realize protection against exploiting accessing memory inappropriately with good security and minimal execution time overhead.

Before discussing the tagging of global variables, the tagging of local variables is first discussed as this is most easy to understand. The examples below use pseudo-code using C programming language.

The following code shows a function foo with a local array variable named arr that is to be protected. The address of arr is passed as argument to another function bar that might access it out of bounds.

```
void foo( )
{
  int arr[10];
  bar (arr);
}
```

The compiler protects this code with tagging by transforming it to the following code: void foo( )

```
{
  int arr[10];
  int*tagged_arr=tagptr(arr); // tag a pointer
     // with random tag
  tagdata(arr, sizeof(arr), tagged_arr); // tag memory
     // with tag of
     // tagged_arr
  bar (tagged_arr);
  untagdata(arr, sizeof (arr));
}
```

This transformation is shown as C code but in reality it will typically happen on an internal code representation used by the compiler and then compiled in the specific target machine code. The additional code needed for protection is shown in italics. The protection includes tagging the pointer which introduces a new pointer called tagged_arr. The pointer tagged_arr is set by a function tagptr that takes the input the array arr that is to be tagged. In this case tagptr randomly generates a random tag value that is then added to unused bits in the pointer which are typically the upper bits of the pointer to the array arr. Every time function foo is called, foo will generate another random tag for the local variable called arr. Next, the array arr is also tagged in memory with the random tag using a function tagdata. The function tagdata receives as inputs arr, the size of arr, and the pointer tagged_arr. The function tagdata extracts the random tag from the pointer tagged_arr, and adds the random tag to the array arr. Then the function bar is called with tagged_arr as the input instead of arr in the first example. For local variables the data in memory has to be untagged after the function to which the local variable belongs is finished. In the code above this is done by the function untagdata. The function untagdata is used to untag the array arr, which removes the random tag from the data in memory. In reality, this will not be implemented by function calls as shown, but instead the compiler will generate special instructions to implement this tagging scheme. The code above is used to show in a readable manner how the tagging is done.

Heap data is treated similarly. However, because the lifetime of a variable is determined by the allocator and deallocator calls (e.g., malloc and free) these functions have to perform the tagging and the untagging respectively.

First a straightforward method for tagging global variables will be described. Global variables are very different from local variables for at least two reasons. First, global variables are alive and available during the whole lifetime of the program while a local variable is only alive and available for the time that the function in which it is allocated is executed. Second, a global variable may be referenced, accessed, and changed from multiple source code modules (source code files) that are compiled independently of each other. If a global variable is accessed, then the address of the global variable is put in a temporary pointer generated by the compiler. Typically this temporary pointer will be allocated to a register. The temporary pointer will be tagged. It is important that this tag is the same for all accesses from all source code modules and that this tag is same as the tag that has been put on the data in memory corresponding to the global variable. A straightforward compilation scheme for tagging global variables is to base the tag on a hash value of the name of the global variable. Then the tag will be the same for a global variable referenced from multiple source code modules as they will reference the variable via the same name and therefore the same hash value and same tag value. This following code demonstrates this method of protection. First the unprotected code is illustrated (as before):

```
int arr[10]; // a global variable
void foo( )
{
   bar(arr);
}
```
This code could be protected as follows:
```
int arr[ 10]; // a global variable
void foo( )
{
   int*tagged_arr=arr/0x4200000000000000;
   bar (tagged_arr);
}
```

For simplicity, the type casts have been omitted that will be necessary to compile this code successfully. The code above inserts tag 42 (in hexadecimal) on a pointer to arr before it is used. In this case the hexadecimal tag 42 may be the hash of the global variable name. The insertion of the tag in the upper bits of the pointer happens by means of an 'or' operation. The tag is constant and the same tag should be used by each of the source code modules that will access the array am Besides the code above to access a global variable and place a tag on the pointer to the global variable, a tag needs is placed on the data in memory. This should be done using a so called constructor function that runs before the application is executed. The following function is what needs to be applied by this constructor function:

tagglobaldata(arr, sizeof(arr), 0x42);

This function operates like the function tagdata described above, but instead on the global data array arr.

There are two issues with this compilation scheme that are desirable to improve. First, tagging the address of arr needs several instructions for composing this long constant and then OR-ing the constant with the address of arr. This is a performance issue. To some extent this performance issue may be handled with a specialized instruction that places a fixed tag on an pointer value, but requires the creation of a specialized instruction. Second, the global variable is always tagged with value 42, in this case, every time the program is executed because the hash value of the variable stays the same. An attacker may learn and exploit this. It would be much more secure if a particular global variable would be tagged with a new random variable every time the program is executed. This would improve security.

The proposed embodiment of a compilation scheme that is described in the next section below addresses both issues. The global tagging method to access a tagged global variable is illustrated as follows:

```
int arr[10]; // a global variable
int*tagged_arr; // a global tagged pointer to arr
void foo( )
{
   bar(tagged_arr);
}
```
wherein the constructor function including the following code is executed:
```
tagged_arr=tagptr(arr); // tag the global pointer
              // with a random tag
tagdata (arr, sizeof (arr), tagged_arr); // tag memory
              // with the tag of
              // tagged_arr
```

The functions tagptr and tagdata work like those described above, but instead operate on a global variable arr that is tagged before any program accesses arr. So for every global variable G (making the description more generic) an additional global tagged pointer to that global variable is created with the name tagged_G. In order to avoid conflicts with existing variables whose name starts with 'tagged', another prefix might be selected instead, for example, '_tagged_' or "$global_tagged_." The global variable is accessed by first loading the tagged pointer from memory and then using this pointer to access the global variable in memory.

With this compilation scheme, new random tags are selected for each global variable for every execution of the program instead of using constant values that are selected by the compiler. Furthermore, the execution time overhead of accessing a global variable is one additional load instruction. This minimizes the execution time overhead.

When the global variable has been defined in another source code module, code like the following may be used (notice the extern keyword):
```
extern int arr[ ]; // an external global variable
void foo( )
{
   bar(arr);
}
```
This code is compiled as follows to add the needed tagging protection:
```
extern int*tagged_arr; // a tagged pointer to arr
void foo( )
{
   bar(tagged_arr);
}
```
Only the source module where a global variable is defined creates an additional global tagged pointer to this global variable and code for initializing the pointer and the global variable using a constructor function.

For improved security, the compiler may group all created tagged pointers to global variables in one memory segment and make this memory segment read-only after the pointers have been initialized. This prevents certain opportunities for an attacker.

FIG. 1 is a diagram illustrating how the storage of tagged global variables may be organized in a memory. The memory 100 includes sections that store data 102 and tags on the data 112. The compiler determines the location of tags on the data 112 in a known location relative to its related data 102. An example global variable arr 104 has various elements (in this specific case 10 elements) of an array stored in section of memory as shown. Global variable arr 104 is shown as stored starting at memory address 1000. Hence, a pointer or reference to the global variable arr 104 would be set to 1000 in order to access the global variable arr. Tags 114 for each of the elements of the global variable arr 104 are also shown. The location of these tags 114 in memory is not specifically shown, but would be specified by the compiler when the global variable arr 114 is specified. Also shown in the memory is the pointer tagged_arr 106 with a randomly generated tag 108 of 0x059 in the upper bits, which is the same as the tags 114 placed on each element of arr. The variable tagged_arr 106 is shown as being stored at memory address 2000, and the variable tagged_arr 106 includes the memory address of 1000 that points to the global variable arr in addition to the tag value of 0x59. This indirect reference to the global variable arr 104 allows for software to use tags that may be randomly generated each time the software executes, to thereby foil attempts at determining the value of the tag by an attacker.

An example of possible machine code for accessing the global variable arr 104 using both the unprotected approach and the protected approach will now be described. Unprotected machine code to access the 9th element arr[9] 104 is shown below using two execution registers R10 and R11:

R10: 1000
R11: load(R10, 9)

In the unprotected machine code (i.e., with no tagging applied), the address constant 1000 is put in register R10, and then a load is performed with R10 as base address and offset 9. This direct method means that a randomly generated tag cannot be added to the address or pointer 1000 at runtime. If such a tag were added, the tag could only be added at compile time and thus would be the same each time the software is executed.

Protected code implementing the embodiments described above to access the $9^{th}$ element of arr[9] 104 instead would use execution registers R10, R11, and R12 as shown below:

R10: 2000
R11: load(R10)
R12 : load(R11, 9)

In the protected machine code, the address of tagged_arr (2000) is first loaded in in register R10. Next, the value of tagged_arr 106 is loaded in register R11. Finally, a load is performed in R12 where R11 (containing the address 1000 and the tag 0x59) is used as a base register and 9 as offset. This indirect access to the global variable arr 104 using the tagged pointer tagged_arr 106 allows the software to randomly select and add the tags 108, 114 at runtime, which means that the tag may be different each time the software is executed. The shown code roughly corresponds with assembly code that would result in compiling source code for accessing a global variable with random tagging. Further, during operation, the tag in the pointer and the tag with data accessed are compared, and if they are not identical, then a fault is indicated and execution of the code may cease or go into some sort of error handling mode.

Figure 2:
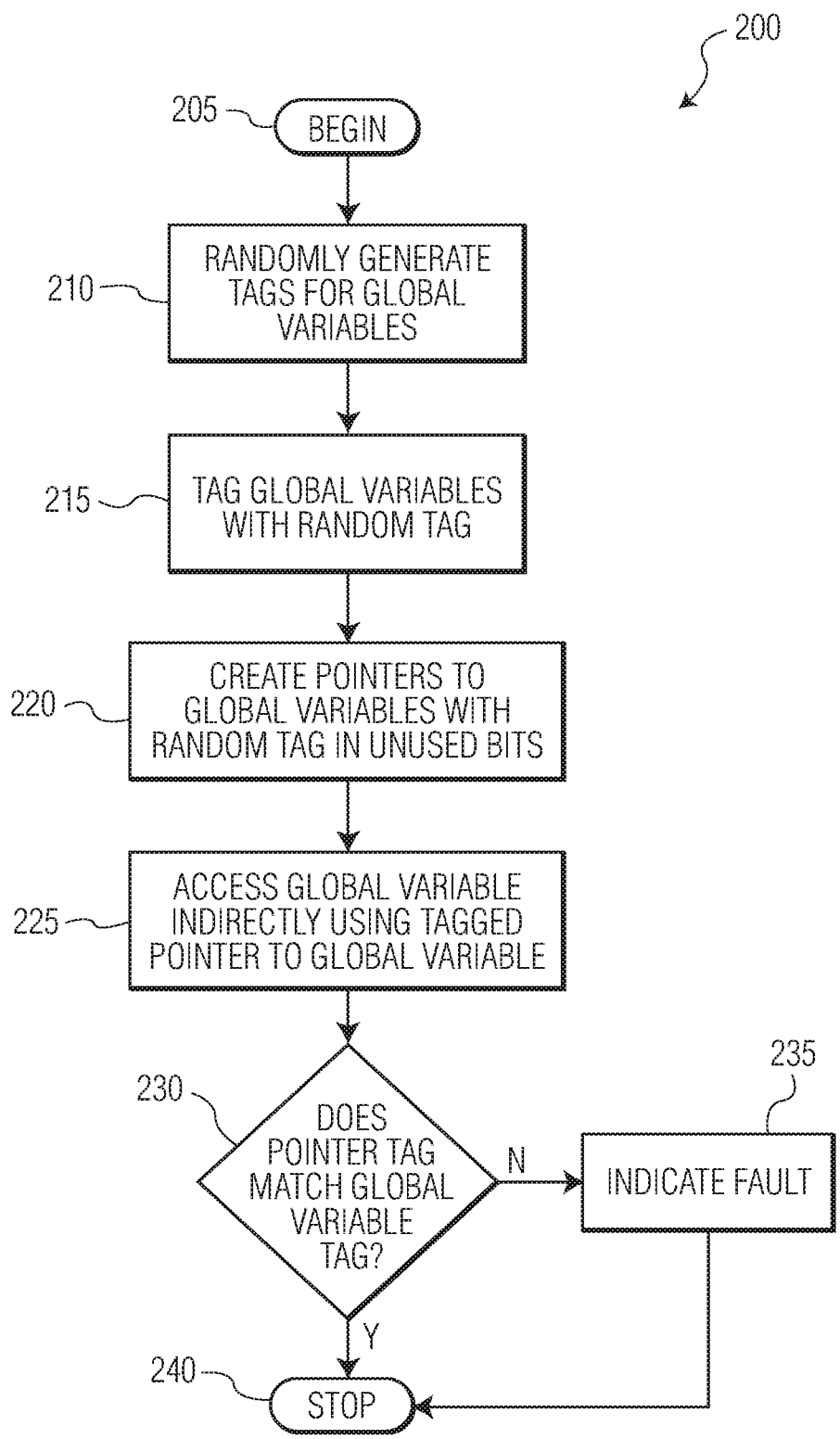
FIG. 2 illustrates a flow diagram showing the method of setting up and accessing a tagged global variable.

FIG. 2 illustrates a flow diagram showing the method 200 of setting up and accessing a tagged global variable. When the software code with global variables is compiled, the various global variables are identified, and the constructor functions are produced to randomly generate a tag for each random variable, to add the randomly generated tag to the pointer for each global variable, and to add the randomly generated tag to each data element of the global variables. Then each time the code is run, different random tags are generated for each of the global variables. In some embodiments, all of the tagged pointers may be stored in a read only portion of the data storage.

The method begins at 205. Next, the method 200 randomly generates tags for each of the global variables 210. This random tag generation is done each time the software is run, so that each global variable has a different random tag with each execution of the software. The method 200 then tags 215 each of the random variables with an associated random tag. The method 200 next creates pointers 220 to each of the global variables with the randomly generated tag inserted into unused bits of the pointer. Then the method 200 accesses a global variable indirectly using the tagged pointer to the global variable 225. This may be accomplished as described above. Next, the method 200 determines if the pointer tag matches the global variable tag 230. If not, the method 200 indicates a fault 235. Such fault indication may cause the process to stop or to go to an error handling routine. If the pointer tag matches the global variable tag, operation proceeds as normal. The process then ends at 240.

Figure 3:
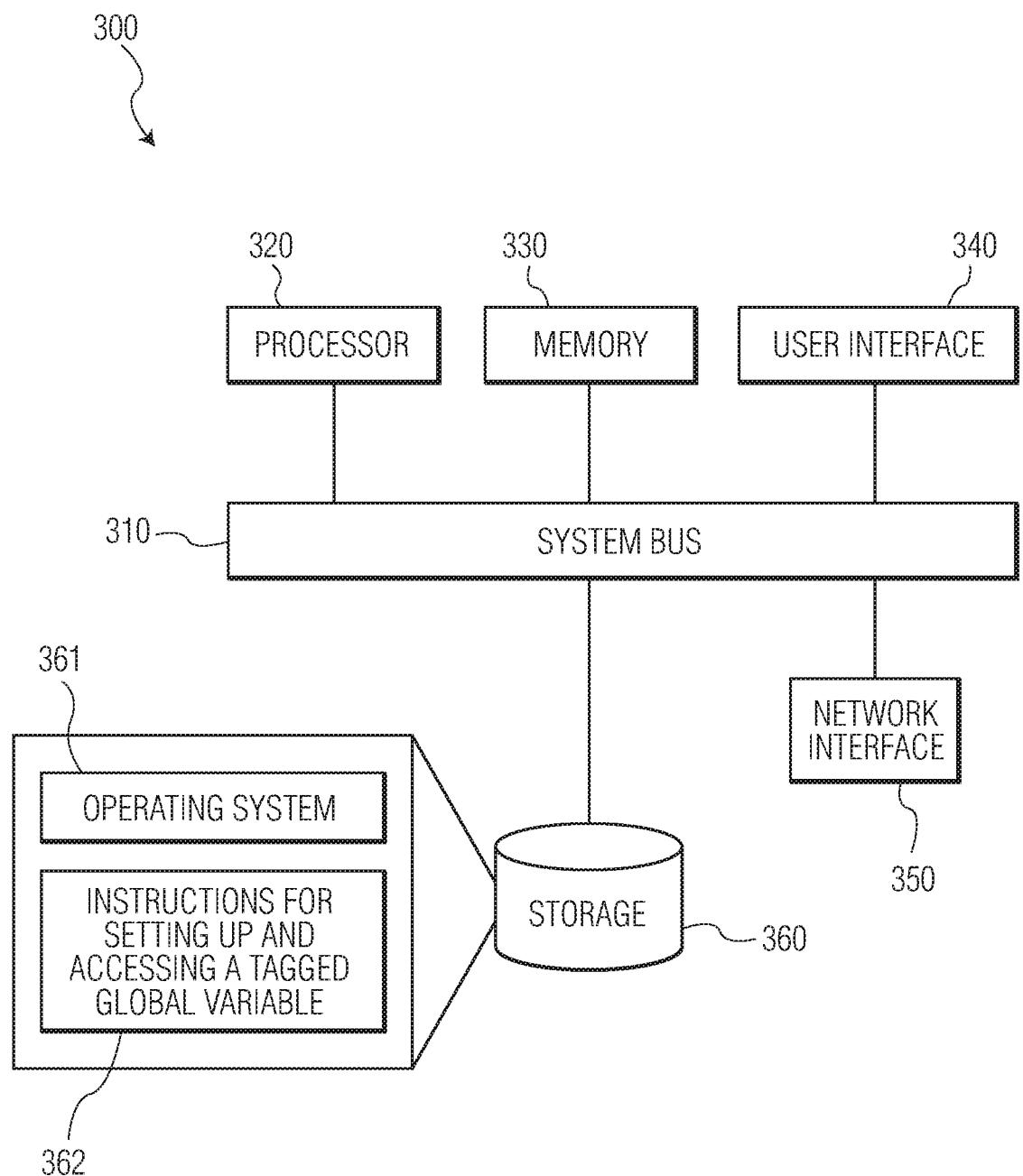
FIG. 3 illustrates an exemplary hardware diagram for setting up and accessing a tagged global variable.

FIG. 3 illustrates an exemplary hardware diagram 300 for setting up and accessing a tagged global variable. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, a graphics processing unit (GPU), field programmable gate array (FPGA), application-specific integrated circuit (ASIC), any processor capable of parallel computing, or other similar devices.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices.

The user interface 340 may include one or more devices for enabling communication with a user and may present information such. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. The storage 362 may store instructions for setting up and accessing a tagged global variable as described above.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Such plurality of processors may be of the same or different types. Further, where the device 300 is implemented in a cloud computing system, the various hardware components may belong to separate physical systems. For example, the processor 320 may include a first processor in a first server and a second processor in a second server.

The system and method for setting up and accessing a tagged global variable described above have various benefits and solved the technical problem of attacks on software developed using unprotected code. Existing solutions only tag local and heap variables, but the embodiments described above illustrated using randomly generated tags on both points and data accessed by that point to improve the security of software using global variables. Such an approach provides a technical improvement in the operation of a computer using unprotected software by making it harder for an attacker to attack the software running on the computer.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for accessing a tagged global variable in software, comprising:
   randomly generating tags for global variables in the software;
   tagging the global variables with the random tags;
   creating a pointer to each global variable with the random tags in unused bits of the pointer wherein the pointer points to the associated global variable;
   accessing one global variable indirectly using the tagged pointer;
   determining whether tag on the accessed global variable matches the tag on the accessed pointer; and
   indicating a fault when the tag on the accessed global variable does not match the tag on the accessed pointer.

2. The method of claim 1, wherein indicating a fault further includes stopping operation of the software.

3. The method of claim 1, wherein indicating a fault further includes executing error handling software.

4. The method of claim 1, wherein each of the global variables has a different randomly generated tag.

5. The method of claim 1, wherein the randomly generating tags for global variables are different each time the software is executed.

6. The method of claim 1, further comprising compiling the software.

7. The method of claim 6, wherein compiling the software includes providing constructor functions to randomly generate the tags, to apply the random tags to the global variable pointer, and to apply the random tags to the global variables.

8. A system for accessing a tagged global variable in software, comprising:
   a memory;
   a processor connected to the memory, the processor configured to:
     randomly generate tags for global variables in the software;
     tag the global variables with the random tags;
     create a pointer to each global variable with the random tags in unused bits of the pointer wherein the pointer points to the associated global variable;
     access one global variable indirectly using the tagged pointer;
     determine whether tag on the accessed global variable matches the tag on the accessed pointer; and
     indicate a fault when the tag on the accessed global variable does not match the tag on the accessed pointer.

9. The system of claim 8, wherein indicating a fault further includes stopping operation of the software.

10. The system of claim 8, wherein indicating a fault further includes executing error handling software.

11. The system of claim 8, wherein each of the global variables has a different randomly generated tag.

12. The system of claim 8, wherein the randomly generating tags for global variables are different each time the software is executed.

13. The system of claim 8, wherein the processor is further configured to compile the software.

14. The system of claim 13, wherein compiling the software includes providing constructor functions to randomly generate the tags, to apply the random tags to the global variable pointer, and to apply the random tags to the global variables.

15. A non-transitory machine-readable storage medium encoded with instructions for accessing a tagged global variable in software, comprising:
   instructions for randomly generating tags for global variables in the software;
   instructions for tagging the global variables with the random tags;
   instructions for creating a pointer to each global variable with the random tags in unused bits of the pointer wherein the pointer points to the associated global variable;
   instructions for accessing one global variable indirectly using the tagged pointer;
   instructions for determining whether tag on the accessed global variable matches the tag on the accessed pointer; and
   instructions for indicating a fault when the tag on the accessed global variable does not match the tag on the accessed pointer.

16. The non-transitory machine-readable storage medium of claim 15, wherein indicating a fault further includes one of stopping operation of the software and executing error handling software.

17. The non-transitory machine-readable storage medium of claim 15, wherein each of the global variables has a different randomly generated tag.

18. The non-transitory machine-readable storage medium of claim 15, wherein the randomly generating tags for global variables are different each time the software is executed.

19. The non-transitory machine-readable storage medium of claim 15, further comprising instructions for compiling the software.

20. The non-transitory machine-readable storage medium of claim 19, wherein compiling the software includes providing constructor functions to randomly generate the tags, to apply the random tags to the global variable pointer, and to apply the random tags to the global variables.

\* \* \* \* \*